3,705,162
4-PHTHALIMIDINE GLUTARIMIDES
Ivars Graudums, Stolberg-Buesbach, Heinrich Mueckter, Aachen, and Ernst Frankus, Schleckheim, near Aachen, Germany, assignors to Chemie Grunenthal GmbH, Stolberg, Germany
No Drawing. Filed June 27, 1968, Ser. No. 740,457
Claims priority, application Germany, July 1, 1967, P 16 70 443.1
Int. Cl. C07d 29/20
U.S. Cl. 260—281          8 Claims

ABSTRACT OF THE DISCLOSURE

Phthalimidine compounds of the formula

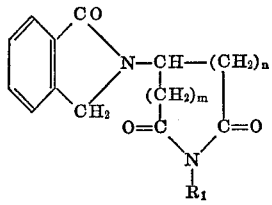

wherein
$R_1$ is hydrogen, alkyl or alkenyl with 1 to 6 carbon atoms which may be substituted by hydroxyl or mercapto groups which may be esterified or etherified, by amino or carboxyl groups, or wherein $R_1$ is cycloalkyl, aryl, aralkyl, or a five- or six-membered heterocyclic ring which may also be substituted, and $m$ and $n$ are the numerals 0, 1, or 2, the sum of $m$ and $n$ being 1 or 2,
have valuable pharmaceutical properties, such as immuno-suppressive, sedative and furthermore antitumor activities in rats. Examples of such compounds are the 3- or 4-phthalimidino piperidine-2,6-diones, the 3-phthalimidino pyrrolidine-2,5-dione and their 1-alkyl, 1-amino methyl, 1-morpholino methyl, 1-piperidino methyl, 1-pyrrolidino methyl derivatives.

They are produced, for instance, by reacting the phthalimidino glutaric acids or succinic acid with ammonia or amines under ring closure conditions. The compounds wherein $R_1$ is an amino methyl group are produced by reacting the respective piperidine-2,6-diones or pyrrolidine-2,5-diones with amino compounds or nitrogen heterocyclic compounds in the presence of formaldehyde or the like.

BACKGROUND OF THE INVENTION

The present invention relates to new and valuable phthalimidine compounds and more particularly to phthalimidine compounds which are substituted at their imido nitrogen atom by a piperidine-2,6-dione or a pyrrolidine-2,5-dione group, to a process of producing such compounds, to pharmaceutical compositions containing such new phthalimidine compounds, and to using such compounds therapeutically.

SUMMARY OF THE INVENTION

It is one object of the present invention to provide new and valuable phthalimidine compounds which are substituted at their imido nitrogen atom by a piperidine-2,6-dione or a pyrrolidine-2,5-dione group, said compounds having highly valuable pharmaceutical properties.

Another object of the present invention is to provide a simple and effective process of making such new phthalimidine compounds.

A further object of the present invention is to provide valuable pharmaceutical compositions useful in the treatment of humans and animals.

Still another object of the present invention is to provide a method of using such new phthalimidine compounds in therapy as sedative agents and for other indications.

Still another object of the present invention is to provide new and valuable phthalimidino substituted dicarboxylic acids useful as intermediates in the preparation of the new phthalimidino compounds of this invention.

Other objects of the present invention and advantageous features thereof will become apparent as the description proceeds.

In principle the new compounds according to the present invention correspond to the following Formula I:

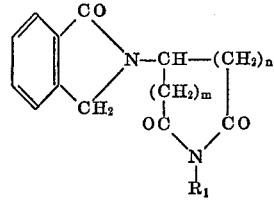

wherein
$R_1$ represents hydrogen, or alkyl or alkenyl with 1 to 6 carbon atoms, which may be substituted, for instance, by hydroxyl or mercapto groups which in turn may be esterified or etherified, by amino or carboxyl groups, or wherein $R_1$ represents cycloalkyl, aryl, aralkyl, or a five- or six-membered heterocyclic ring, which cycloalkyl, aryl, aralkyl, or heterocyclic ring may also be substituted and wherein
$m$ and $n$ represent the numerals 0, 1, or 2, the sum of $m$ and $n$ being 1 or 2.

If the substituent $R_1$ represents alkyl, which is substituted by an amino group, the amino group may be a primary, secondary, or tertiary amino group or it may be an amino group in which the nitrogen atom is part of a 5- or 6-membered heterocyclic ring, for instance, the pyrrolidino, piperidino, morpholino or N-methylpiperazino ring. Thus the substituent $R_1$ may be an amino alkyl group such as an amino ethyl group, a methylamino ethyl group, a diethylamino ethyl, or a morpholino methyl group or the like groups. Preferred are those compounds of Formula I, in which the sum of $m$ and $n$ is 2 and in which $R_1$ represents hydrogen or a member of the aforementioned groups, which may be substituted by a non-reactive group or which may be unsubstituted.

The compounds of Formula I may contain an asymmetrical carbon atom and, therefore, may exist in the form of isomers. Thus the racemic forms of the compounds of Formula I or mixtures of their isomers, as well as the pure isomers, i.e. the optically active forms of the compounds of Formula I and the mixtures of these different forms are also within the scope of the present invention.

The new phthalimidine compounds according to the present invention have a number of highly valuable pharmaceutical properties. They have marked neuroendocrinous properties and, therefore, exert a noteworthy antitumor effect as can be shown by the following test:

Female Sprague-Dawley (SD) rats of an age between 50 days and 65 days with a mean weight of 160 g. are given a single dose of 20 mg. of 7,12-dimethyl benzanthracene in 1 ml. of sesame oil by means of a stomach tube. This treatment produces tumors in the region of the milk ridge. The number of these tumors is counted and their size is measured. Treatment of animals in which mammary tumors were induced in this manner with compounds of Formula I results in a decrease of the number as well as the size of the tumors in comparison with untreated control animals. The size of the tumor was calculated in sq. mm. as the product of the largest and smallest diameters of the tumor as can be ascertained percutaneously. Starting with an average size of 509.6 sq. mm. in 10 animals, the tumor size in untreated animals increases within six weeks to a size of 1,180.5 sq. mm. and the number of tumors is increased from 2.3 to 4.5 (mean value of 10 animals). If the animals are given a feed containing 0.47% of 3-phthalimidino piperidine-2,6-dione or, respectively, 0.47% of 4-phthalimidino piperidine-2,6-dione for a period of 6 weeks, the tumor size is changed from 473.5 sq. mm. to 490.2 sq. mm. or, respectively, from 555.5 sq. mm. to 364.2 sq. mm., and the number of tumors is changed from 2.0 to 2.2 or, respectively, from 2.8 to 2.5 (mean value of 10 animals).

It is evident that the compounds according to the present invention at least considerably retard tumor growth and with some compounds also considerably reduce tumor growth and number, as shown above in rats. The antitumor activity has not been demonstrated in humans.

Furthermore, the compounds of Formula I possess excellent immunosuppressive properties and thus favorably influence acceptance of transplants. They also show a favorable effect on leprous diseases as well as damages caused by X-ray and auto-immune diseases.

Moreover, many of the compounds of Formula I have a marked sedative effect. Thus they have proved of value in veterinary medicine, for instance, for calming vicious and nervous animals to facilitate examination and treatment and also shearing and cutting the hair of dogs, cats, and other animals, to prevent tearing off and thus contamination of dressings, operation wounds and sutures, for suppressing itching, otitis, and the like, to reduce the oversensitivity of animals sensitive to noises and of easily scared animals and of dogs tending to bark continuously, to reduce sexual excitability of male and female animals, and for other indications.

The compounds according to the present invention are of a rather low toxicity. The following Table I, for instance, shows the acute toxicity of 3-phthalimidino piperidine-2,6-dione:

TABLE I

| Animal | $LD_{50}$, mg./kg. | |
|---|---|---|
| | Orally | Intraperitoneally |
| Mouse (NMR I; 18 g. to 25 g.) | 7,000 (40%) | 1,580 (1,330–1,880) |
| Rat (Wistar; 100 g. to 300 g.) | 7,000 (10%) | ca. 3,000 |
| Cat (of mixed race; 1.64 kg. to 4.0 kg.) | 4,000 | |
| Dog (of mixed race; 7.0 kg. to 16.4 kg.) | 2,000 | |

On testing said compound for its chronic toxicity on rats (Wistar), it was found that 100 mg./kg. to 300 mg./kg. of body weight were well tolerated without any side effects. Administration of 1000 mg./kg. for more than 90 days caused increased intercurrent mortality (by 30%) and the animals showed marked weakness in walking. Excretion of urine was reduced. Blood picture, liver function, cholesterol, sodium and potassium content in the serum, however, were not affected.

Other compounds according to the present invention showed a similar low toxicity.

The new and valuable compounds of Formula I can be prepared by starting with the acid of Formula II

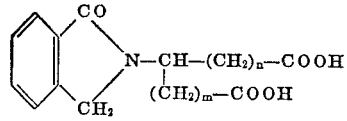

wherein $m$ and $n$ represent the same numerals as indicated above or with a functional derivative thereof.

Especially suitable functional derivatives of such acids of Formula II may be their anhydrides or their mono- or di-amides with amines of Formula III $$H_2N-R_1 \qquad III$$

wherein $R_1$ represents the same substituents as indicated above.

Esters of acids of Formula II with lower aliphatic or aromatic alcohols or with phenols may also be used as the one reactant.

For preparing compounds of Formula I by starting with an anhydride of an acid of Formula II and an amine of Formula III, it has proved to be of advantage to heat the reaction mixture in order to complete the reaction or to perform the reaction in the presence of an agent able to promote ring closure. The water generated during the reaction is preferably removed by azeotropic distillation.

To successfully carry out the process according to the present invention it does not matter whether an amine of Formula III or a compound which is able to form an amine of Formula III under the reaction conditions is used. Such compounds are, for instance, salts of the respective amine such as its carbonates. Other compounds which are able to form an amine of Formula III are, for instance, urea compounds, thiourea compounds, or carbonic acid amides which are derived from such amines.

By starting with a mono- or di-amide of an acid of Formula II and an amine of Formula III ring closure is preferably effected by heating. Advantageously agents which are able to promote ring closure, such as acetic acid anhydride, thionylchloride, acetylchloride or similar acidic compounds are added to the reaction mixture.

To produce compounds of Formula I in which the substituent $R_1$ is alkyl which is substituted by an amino group, especially the amino methylene group of Formula IV

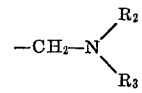

wherein $R_2$ and $R_3$ may be the same or different substituents and represent hydrogen, lower alkyl, aryl or aralkyl, which may be substituted, or wherein $R_2$ and $R_3$, together with the nitrogen atom to which they are attached, form a five-membered or a six-membered heterocyclic ring, there is reacted a compound of Formula V

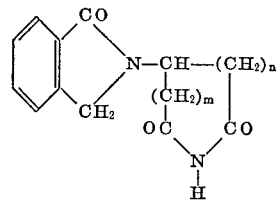

wherein $m$ and $n$ represent the same numerals as indicated above with a compound of Formula VI

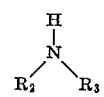

wherein $R_2$ and $R_3$ represent the same substituents as indicated above, in the presence of formaldehyde.

In place of the amine base of Formula VI, there may be employed an acid addition salt of the amine of Formula VI in the presence of formaldehyde. Preferably the formaldehyde is used in the form of its aqueous or alcoholic solution. In place of formaldehyde, there may be used compounds which are able to form formaldehyde under the reaction conditions, such as paraformaldehyde or chloro methyl methyl ether. It is advisable to perform the reaction in presence of solvents or diluents, preferably of organic solvents such as methanol, ethanol, or β-ethoxy ethanol, or of mixtures of water and organic solvents. The reaction is suitably carried out at elevated temperature, for instance, at a temperature between 50° C. and 80°

C. However, it is also possible to work at room temperature or with cooling. Stoichiometric amounts of the compounds of Formulas V and VI and formaldehyde may be used. On the other hand it is also possible to use an excess of one or two of the three components. The compounds of Formula I are preferably isolated by adding to the reaction mixture a liquid in which the reaction products are insoluble or only very little soluble. When isolating compounds that are, for instance, poorly soluble in alcohol, from a mixture of water and alcohol, precipitation of the reaction product is effected by adding more alcohol to the reaction solution. The compounds may also be isolated by cooling the reaction mixture, whereupon the compounds crystallize, especially after concentration of the reaction mixture. Alternatively, the solvent or diluent is removed by distillation and the resulting residue is then recrystallized from suitable solvents or mixtures of solvents.

The compounds of Formula I, wherein $R_1$ represents methylene substituted by an amino group, may also be prepared by reacting a compound of Formula VII

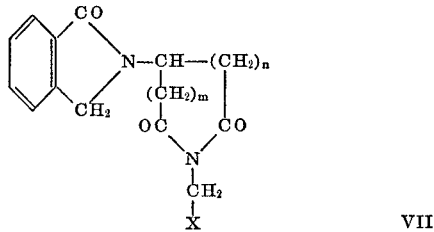

VII wherein m and n represent the same numerals as given hereinabove and wherein X represents a hydroxyl group, halogen, or an esterified hydroxyl group, with a compound of Formula VI or a salt thereof. This reaction may be carried out in the presence of an organic solvent and, if desired, the compound H—X formed during the reaction is removed from the reaction mixture by azeotropic distillation.

Furthermore, the compounds of Formula I, wherein $R_1$ represents methylene which is substituted by an amino group, can be obtained by reacting a compound of Formula V with a compound of Formula VIII

VIII wherein $R_2$, $R_3$, and X represent the same substituents as given hereinabove.

This reaction is preferably carried out in the presence of an organic solvent and, if desired, the compound H—X formed during the reaction is removed from the reaction product by azeotropic distillation.

The new compounds of Formula II are obtained by reducing one of the carbonyl groups of an acid of Formula IX

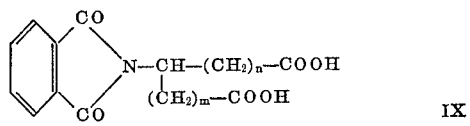

IX wherein m and n represent the same numerals as indicated hereinabove, to the methylene group —$CH_2$—. An ester of an acid of Formula IX may also be used as starting material in this reduction process. If the reduction in this case is carried out according to Clemmensen, the ester group may be hydrolyzed at the same time, thus yielding the acid of Formula II.

The reduction may be carried out not only according to Clemmensen. Electrolytic reduction or reduction with hydrogen in the presence of cobalt or nickel catalysts may also be used.

DESCRIPTION OF THE PREFERRED EMBODIMENTS

The following examples serve to illustrate the present invention without, however, limiting the same thereto. All the melting and boiling points given are uncorrected. In proceeding according to the examples maximum yields were not intended to be obtained.

EXAMPLE 1

3-phthalimidino piperidine-2,6-dione 2.45 g. of α-phthalimidino glutaric acid anhydride are mixed with 0.3 g. of urea and heated to 180° C. for 90 minutes. After chilling and recrystallization from acetic acid, 3-phthalimidino piperidine-2,6-dione melting at 240–242.5° C. is obtained.

The α-phthalimidino glutaric acid anhydride used as starting material is obtained as follows:

108 g. of α-phthalimidino glutaric acid are dissolved in a mixture of 833 ml. of acetic acid anhydride and 29.7 ml. of thionylchloride. The solution is refluxed until evolution of gaseous hydrochloric acid has ceased. On cooling, α-phthalimidino glutaric acid anhydride precipitates. The yield is 90% of the theoretical yield; the melting point is 254–257° C. under decomposition.

EXAMPLE 2

187 g. of α-phthalimidino glutaric acid anhydride are suspended in 1,870 ml. of absolute dioxane. Dry ammonia is introduced into the suspension at room temperature. The temperature is then increased to 80° C. The resulting precipitate is filtered off, washed with ether, and dried. 208 g. of said compound are dissolved in 420 ml. of water. 65 ml. of concentrated hydrochloric acid are added dropwise to the clear solution which has been filtered, if necessary, while stirring. On standing, 192 g. of the monoamide of α-phthalimidino glutaric acid precipitate. After recrystallization from ethanol, its melting point is 191–192° C.

132 g. of said compound are heated with a mixture of 518 ml. of acetic acid anhydride and 57.8 ml. of thionylchloride to 90°–95° C. until evolution of gaseous hydrochloric acid has ceased. On cooling and, if necessary, after distilling off part of the solvent, 3-phthalimidino piperidine-2,6-dione precipitates. The yield is 76% of the theoretical yield. The compound is identical with that obtained according to Example 1.

EXAMPLE 3

1-methyl-3-phthalimidino piperidine-2,6-dione is prepared following the procedure described in Example 2, but using as the one reactant gaseous methylamine. After recrystallization from ethanol, its melting point is 139–141° C.

EXAMPLE 4

1-ethyl-3-phthalimidino piperidine-2,6-dione is prepared by proceeding as follows:

40 g. of α-phthalimidino glutaric acid anhydride are suspended in 400 ml. of absolute dioxane. 18.5 g. of ethylamine are added dropwise to the suspension while stirring. The reaction mixture is heated to 80–85° C. for two hours. The solvent is distilled off in a vacuum and the residue is dissolved in 80 ml. of water. On adding 13.5 ml. of concentrated hydrochloric acid, α-phthalimidino glutaric acid N-ethylamide precipitates. Its melting point is 141–144° C. after recrystallization from acetone.

23.5 g. of said compound are dissolved in a mixture of 97 ml. of acetic acid anhydride and 9.8 ml. of thionylchloride. The mixture is heated to 90–95° C. until evolution of gaseous hydrochloric acid has ceased. On cooling and, if necessary, after distilling off part of the solvent, and adding 200 ml. of ether, 1-ethyl-3-phthalimidino piperidine-2,6-dione precipitates. Its melting point is 177–180° C. after recrystallization.

EXAMPLE 5

On following the procedure described in Example 4 but using as the one reactant the appropriate amines and without isolation of the intermediates, the following compounds are obtained:

(a) With n-propylamine, 1-n-propyl-3-phthalimidino piperidine-2,6-dione, melting point 97–99.5° C. It is recrystallized by dissolving in ethanol and adding petroleum ether thereto until crystallization sets in.

(b) With n-hexylamine, 1-n-hexyl-3-phthalimidino piperidine-2,6-dione, melting point: 95–99° C., after recrystallization from ethanol.

(c) With allylamine, 1-allyl - 3 - phthalimidino piperidine-2,6-dione, melting point: 155–157.5° C. after recrystallization from ethanol.

(d) With aniline, 1-phenyl-3-phthalimidino piperidine-2,6-dione, melting point: 198–200° C. after recrystallization from an ethylene glycol mono-ethyl ether.

(e) With benzylamine, 1-benzyl-3-phthalimidino piperidine-2,6-dione, melting point: 158:161° C. after recrystallization from ethanol.

EXAMPLE 6

4-phthalimidino piperidine-2,6-dione 302 g. of β-phthalimidino glutaric acid are dissolved in a mitxure of 1,725 ml. of acetic acid anhydride and 84.5 ml. of thionylchloride. The mixture is refluxed until evolution of gaseous hydrochloric acid has ceased. On cooling, β-phthalimidino glutaric acid anhydride precipitates. The yield is 86.5% of the theoretical yield, the melting point of the anhydride is 230–235° C.

254 g. of said compound are suspended in 2,500 ml. of absolute dioxane. At room temperature dry ammonia is introduced into the suspension. The temperature is then increased to 80–85° C. Introduction of ammonia is discontinued when the resulting precipitate becomes water-soluble. The precipitate is filtered off and dissolved in 582 ml. of water. 87 ml. of concentrated hydrochloric acid are added dropwise to the clear solution, which, if necessary, has been filtered while stirring. On cooling, 270 g. of β-phthalimidino glutaric acid mono-amide precipitate. Its melting point is 228–230° C.

270 g. of said compound are dissolved in a mixture of 1,140 ml. of acetic acid anhydride and 118 ml. of thionylchloride. The mixture is heated to 90–95° C. until evolution of gaseous hydrochloric acid has ceased. On cooling, 4-phthalimidino piperidine-2,6-dione precipitates. The yield is 74% of the theoretical yield. After recrystallization from acetic acid, its melting point is 244–249° C.

EXAMPLE 7

3-phthalimidino pyrrolidine-2,5-dione 34.5 g. of phthalimidino succinic acid are dissolved in a mixture of 150 ml. of acetic acid anhydride and 10.1 ml. of thionylchloride. The mixture is refluxed until evolution of gaseous hydrochloric acid ceases. On cooling, phthalimidino succinic acid anhydride precipitates. The yield is 90% of the theoretical yield. Its melting point is 192–196° C.

28.7 g. of the aforementioned compound are mixed with 3.73 g. of urea. The mixture is heated to 180–185° C. for 15 minutes. After cooling and recrystallization from acetic acid, 3-phthalimidino pyrrolidine-2,5-dione is obtained, melting point: 266–270° C. The yield is 72% of the theoretical yield.

EXAMPLE 8

1-ethyl-4-phthalimidino piperidine-2,6-dione 30 g. of β-phthalimidino glutaric acid anhydride are suspended in 300 ml. of absolute dioxane. While stirring, 14.5 g. of ethylamine are added dropwise thereto and the reaction mixture is heated to 80° C. After cooling, the precipitate is filtered off, washed with ether, and dissolved in 150 ml. of water. 10 ml. of concentrated hydrochloric acid are added to the filtered solution. On standing, 31 g. of β-phthalimidino glutaric acid N-ethylamide are obtained in the form of white crystals; melting point: 215–217° C. Said compound is dried and refluxed with a mixture of 130 ml. of acetic acid anhydride and 130 ml. of acetylchloride for 7 hours. On cooling and, if necessary, after concentrating the solution and adding ether thereto, 24 g. of 1-ethyl-4-phthalimidino piperidine-2,6-dione are obtained. Its melting point is 191–195° C. after recrystallization from n-butanol.

EXAMPLE 9

On following the procedure described in Example 8, but using as the one reactant the appropriate amines, the following compounds are obtained:

(a) With n-hexylamine, 1-n-hexyl-4-phthalimidino piperidine-2,6-dione, melting point: 119–121° C. after recrystallization from ethanol.

(b) With aniline, 1-phenyl-4-phthalimidino piperidine-2,6-dione, melting point: 236–241° C. after recrystallization from ethylene glycol mono-ethyl ether.

EXAMPLE 10

1-morpholino methyl-3-phthalimidino piperidine-2,6-dione 50 g. of 3-phthalimidino piperidine-2,6-dione are suspended in 450 ml. of absolute dioxane and refluxed. 100 ml. of N-methylol morpholine, dissolved in 150 ml. of dioxane, are added dropwise thereto within 10 minutes. After cooling, 1,450 ml. of absolute ether are added. 1-morpholino methyl-3-phthalimidino piperidine-2,6-dione precipitates in a yield of 76% of the theoretical yield. It is recrystallized by dissolving in dioxane and adding ether thereto until crystallization sets in. Its melting point is 171–174° C.

EXAMPLE 11

On following the procedure described in Example 10 but using as the one reactant N-methylol piperidine, 1-piperidino methyl-3-phthalimidino piperidine-2,6-dione is obtained. Its melting point is 165–170° C.

EXAMPLE 12

1-pyrrolidino methyl-3-phthalimidino piperidine-2,6-dione 50 g. of 3-phthalimidino piperidine-2,6-dione are suspended in 250 ml. of ethylene glycol mono-ethyl ether and refluxed. 150 ml. of a solution of formaldehyde (35%, by weight, of formaldehyde in water) are added dropwise thereto followed by the addition of 60 ml. of pyrrolidine. The reaction mixture is refluxed for some time. After cooling, 1-pyrrolidino methyl-3-phthalimidino piperidine-2,6-dione is obtained. The yield is 48% of the theoretical yield. It is recrystallized by dissolving it in dioxane and adding ether thereto until crystallization sets in. Its melting point is 164–165° C.

EXAMPLE 13

On following the procedure described in Example 10, but using as the one reactant 4-phthalimidino piperidine-2,6-dione, 1-morpholino methyl-4-phthalimidino piperidine-2,6-dione is obtained. The yield is 83% of the theoretical yield. Its melting point is 187–190° C. after recrystallization from absolute dioxane.

EXAMPLE 14

1-piperidino methyl-4-phthalimidino piperidine-2,6-dione 12 g. of 4-phthalimidino piperidine-2,6-dione are suspended in 150 ml. of ethanol and refluxed. 25 ml. of a solution of formaldehyde (35%, by weight, of formaldehyde in water) are added. The reaction mixture is refluxed until a clear solution is obtained. After cooling, 1 - methylol - 4 - phthalimido piperidine-2,6-dione is obtained in the form of white crystals, melting point: 152–154° C. under decomposition.

5 g. of 1-methylol-4-phthalimidino piperidine-2,6-dione are dissolved in 50 ml. of ethanol. 2 g. of piperidine are added thereto. The reaction mixture is refluxed for 10 minutes. After cooling, 1 - piperidino methyl - 4 - phthalimidino piperidine-2,6-dione is obtained in the form of white crystals. It is recrystallized by dissolving it in dioxane and adding ether thereto until crystallization sets in. Its melting point is 162–165° C.

EXAMPLE 15

On following the procedure described in Example 12, but using as the one reactant 4-phthalimidino piperidine-2,6-dione, 1-pyrrolidino methyl-4-phthalimidino piperidine-2,6-dione is obtained. The yield is 53% of the theoretical yield. It is recrystallized by dissolving it in dioxane and adding ether thereto, until crystallization sets in. Its melting point is 154–159° C.

Other compounds according to the present invention are prepared in an analogous manner as described in the preceding examples. A number of such compounds are given in the following Table II.

stituted piperazines while otherwise the procedure is the same as described in said examples.

The starting α- and β-phthalimidino glutaric acids and the phthalimidino succinic acid are obtained according to the following examples but without limiting their preparation thereto.

EXAMPLE 36

133 g. of α-phthalimido glutaric acid are dissolved in 1,200 ml. of acetic acid. The solution is heated to 60° C. 168 g. of zinc dust are added in portions thereto. The reaction mixture is heated under reflux for 4 hours. The hot solution is filtered and the residue is washed with acetic acid. On cooling the combined filtrate and wash acid, α-phthalimidino glutaric acid is obtained in the form of white crystals. The yield is 70% of the theoretical yield. Its melting point is 236–237° C. after recrystallization from water.

EXAMPLE 37

On following the procedure described in Example 36, β-phthalimidino glutaric acid is obtained from β-phthalimido glutaric acid. The yield is 91% of the theoretical yield. Its melting point is 280–281° C.

EXAMPLE 38

Phthalimidino succinic acid is obtained from phthalimido succinic acid on following the procedure described in Example 36. The melting point of this compound is 229–235° C. under decomposition.

The new compounds are administered orally in the form of powders, tablets, dragées, lozenges, or other solid shaped or liquid preparations. Parenteral and es-

TABLE II

| Example No. | Starting material | Amine | Formaldehyde | Reaction product |
|---|---|---|---|---|
| 16 | 3-phthalimidino pyrrolidine-2,5-dione | Morpholine | + | 1-morpholino methyl-3-phthalimidino pyrrolidine-2,5-dione. |
| 17 | do | Piperidine | + | 1-piperidino methyl-3-phthalimidino pyrrolidine-2,5-dione. |
| 18 | do | Dimethylamine | + | 1-dimethylamino methyl-3-phthalimidino pyrrolidine-2,5-dione. |
| 19 | do | N-methyl piperazine | + | 1-(N-methyl piperazino) methyl-3-phthalimidino pyrrolidine-2,5-dione. |
| 20 | do | β-Naphthylamine | + | 1-(β-naphthylamino) methyl-3-phthalimidino pyrrolidine-2,5-dione. |
| 21 | do | α-Naphthylamine | + | 1-(α-naphthylamino) methyl-3-phthalimidino pyrrolidine-2,5-dione. |
| 22 | do | Aniline | + | 1-anilino methyl-3-phthalimidino pyrrolidine-2,5-dione. |
| 23 | do | N-carbethoxy piperazine | + | 1-(N-carbethoxy piperazino)methyl-3-phthalimidino pyrrolidine-2,5-dione. |
| 24 | do | 3,3-dimethyl-6-phenyl morpholine | + | 1-(3',3'-dimethyl-6'-phenyl)methyl-3-phthalimidino pyrrolidine-2,5-dione. |
| 25 | do | Pyrrolidine | + | 1-pyrrolidino methyl-3-phthalimidino pyrrolidine-2,5-dione. |
| 26 | do | β,β'-Dichloro diethylamine | + | 1-(β,β'-dichloro diethylamino) methyl-3-phthalimidino pyrrolidine-2,5-dione. |
| 27 | 1-methylol-3-phthalimidino pyrrolidine-2,5-dione | N-methylamino morpholine | − | 1-(N-methyl-N-morpholino) amino methyl-3-phthalimidino pyrrolidine-2,5-dione. |
| 28 | do | N-methylamino piperidine | − | 1-(N-methyl-N-piperidino) amino methyl-3-phthalimidino pyrrolidine-2,5-dione. |
| 29 | do | N-methylamino pyrrolidine | − | 1-(N-methyl-N-pyrrolidino) amino methyl-3-phthalimidino pyrrolidine-2,5-dione. |
| 30 | 3-phthalimidino piperidine-2,6-dione | N-methylamino morpholine | + | 1-(N-methyl-N-morpholino)amino methyl-3-phthalimidino piperidine-2,6-dione. |
| 31 | 4-phthalimidino piperidine-2,6-dione | N-methylamino piperidine | + | 1-(N-methyl-N-piperidino)amino methyl-4-phthalimidino piperidine-2,6-dione. |
| 32 | 3-phthalimidino piperidine-2,6-dione | N-methyl-N'-methylol piperazine | − | 1-(N-methyl piperazino) methyl-3-phthalimidino piperidine-2,6-dione. |
| 33 | do | N-methylamino piperidine | + | 1-(N-methyl-N-piperidino)amino methyl-3-phthalimidino piperidine-2,6-dione. |
| 34 | 4-phthalimidino piperidine-2,6-dione | N-methylamino morpholine | + | 1-(N-methyl-N-morpholino)amino methyl-4-phthalimidino piperidine-2,6-dione. |
| 35 | do | N,N,N'-trimethyl-N'-hydroxy methyl hydrazine | − | 1-(N-methyl-N-dimethylamino)amino methyl-4-phthalimidino piperidine-2,6-dione. |

In place of the amines used as reactants in the preceding examples, there may be employed other primary and secondary amino compounds, such as other lower alkylamines, lower alkanolamines, toluidines, phenyl ethylamine and other aryl lower alkylamines, halogen and lower alkyl substituted anilines, toluidines, naphthylamines, other five- or six-membered heterocyclic compounds with a reactive hydrogen atom attached to a ring-nitrogen atom, or C-substituted heterocyclic compounds such as the lower alkyl substituted morpholines, piperidines, pyrrolidines, piperazines, or other N-lower alkyl, N-benzyl, N-(β-hydroxy ethyl), N-lower alkanoyl subpecially intramusclular or intravenous administration in the form of aqueous solutions or of suspensions and rectal administration in the form of suppositories and the like is also possible.

Preparations to be administered orally are obtained, for instance, by diluting the active compounds with a solid pulverulent extending agent or pharmaceutical carrier to form an intimate mixture thereof. The components of said mixture, for instance, are intimately mixed in a ball mill or the like device to the desired degree of fineness, or the finely powdered solid carrier is impregnated with a solution of said compound in water or in other suitable solvents, whereafter the water or solvent is removed by evaporation, preferably while milling.

Tablets, pills, dragées, and the like compressed and shaped preparations are prepared by using the commonly employed diluting agents, binders and the like additives, such as sugar, lactose, talc, starch, bolus alba, pectin; as binders gelatin, gum arabic, methyl cellulose, yeast extract, agar, tragacanth; as lubricants stearic acid, magnesium stearate, and others.

The following examples serve to illustrate compositions containing the new compounds according to the present invention as they are used in therapy without, however, limiting the same thereto.

EXAMPLE 39

100 g. of 3-phthalimidino piperidine-2,6-dione are intimately mixed with 238 g. of starch, 144 g. of lactose, and 4 g. of o-benzoic acid sulfimide sodium. The mixture is granulated with 140 g. of a 10% aqueous starch paste. The moist granulate is passed through a 1 mm. sieve, dried at 40° C., and again passed through such a sieve. The resulting granulate is mixed with 20 g. of starch, 9 g. of talc, and 1 g. of magnesium stearate. Said mixture is tabletted to tablets of 640 mg. each and a diameter of 13 mm. Each tablet contains 100 mg. of the active agent.

EXAMPLE 40

Capsules, each containing 150 mg. of 4-phthalimidino piperidine-2,6-dione are prepared by intimately mixing 150 g. of said compound with 38.5 g. of dicalcium phosphate, 1.25 g. of liquid paraffin (German Pharmacopeia VI) and 0.25 g. of magnesium stearate, sieving said mixture, and filling 190 mg. of said mixture into each gelatin capsule.

EXAMPLE 41

180 g. of cocoa butter or the same amount of a synthetic suppository base are molten and triturated with 20 g. of 1-methyl-3-phthalimidino piperidine-2,6-dione. The mixture is poured into suppository molds, each containing 2 g. of the mixture, and the mold is cooled to solidify the suppositories. Each suppository contains 200 mg. of the active compound.

EXAMPLE 42

100 g. of 3-phthalimidino pyrrolidine-2,5-dione, 260 g. of starch, 96 g. of lactose, and 4 g. of o-benzoic acid sulfimide sodium are granulated, sieved, and dried at 40° C. as described in Example 39. The granulate is mixed with 20 g. of starch, 9 g. of talc, and 1 g. of magnesium stearate and pressed to tablets of 500 mg. each and a diameter of 12 mm. serving as dragée cores. These cores are sugarcoated in the conventional manner to yield dragées, each containing 100 mg. of the active compound.

Of course, by variation and calculation of the ingredients tablets and other compositions are prepared containing lower or higher amounts of the essential active agents as desired. For instance, the tablets of Example 39 may contain 50 mg., 150 mg. or 200 mg., the gelatin capsules of Example 40 100 mg., 200 mg., or 300 mg., and the dragées of Example 42 50 mg., 150 mg., or 200 mg. of the respective active compounds.

As is evident from Examples 39 to 42, the essential active ingredient is incorporated into dosage unit forms, each containing a calculated amount of the essential active ingredient to provide the particular desired therapeutic effect. Generally the unit dosage forms are prepared by suitable admixing with a pharmaceutical carrier, either solid or liquid, which constitutes a major amount of the dosage unit form as described, for instance, in said examples.

The particular form of the above given compositions of Examples 39 to 42 and the like preparations in which the essential active ingredient is administered orally, rectally or otherwise is formulated and prepared to supply an effective amount of the said ingredient for the desired therapeutic effect.

Oral administration of single doses between about 50 mg. and about 300 mg. and preferably between 100 mg. and 200 mg. and a daily dose between 100 mg. to 600 mg. two to four times daily in intervals has proved to be highly effective.

Of course, many changes and variations in the starting materials and reactions, in the reaction conditions, concentration of the reactants, solvents used, temperature, and duration, in the methods of working up the reaction products and of isolating and purifying the active agents, in the preparation of pharmaceutical compositions containing the active agents, in the manner of administering the same, and the like may be made by those skilled in the art in accordance with the principles set forth herein and in the claims annexed hereto.

We claim:
1. A phthalimidine of the formula

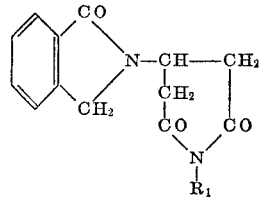

wherein $R_1$ is hydrogen, alkyl of 1 to 6 carbon atoms, alkenyl of 2 to 6 carbon atoms, cycloalkyl of 5 to 7 carbon atoms, phenyl, benzyl, pyrrolidino methyl and piperidinomethyl.

2. The phthalimidine of claim 1 which is 1-ethyl-4-phthalimidino piperidine-2,6-dione.

3. The phthalimidine of claim 1 which is 4-phthalimidino piperidine-2,6-dione.

4. The phthalimidine of claim 1 which is 1-n-hexyl-4-phthalimidino piperidine-2,6-dione.

5. The phthalimidine of claim 1 which is 1-phenyl-4-phthalimidino piperidine-2,6-dione.

6. The phthalimidine of claim 1 wherein $R_1$ is piperidinomethyl.

7. The phthalimidine of claim 1 wherein $R_1$ is benzyl.

8. The phthalimidine of claim 1 wherein $R_1$ is pyrrolidino methyl.

References Cited

UNITED STATES PATENTS

| | | | |
|---|---|---|---|
| 3,471,548 | 10/1969 | Keberle | 260—471 |
| 3,625,946 | 12/1971 | Koch | 260—281 |
| 2,742,475 | 4/1956 | Hoffmann et al. | 260—293.4 |
| 2,749,346 | 6/1956 | Hoffmann et al. | 260—281 |
| 2,830,991 | 4/1958 | Keller et al. | 260—281 |
| 3,198,798 | 8/1965 | Zenitz | 260—268 |
| 3,314,960 | 4/1967 | Freed et al. | 260—281 |
| 3,432,499 | 3/1969 | Rice et al. | 260—281 X |

FOREIGN PATENTS

| | | | |
|---|---|---|---|
| 962,857 | 7/1964 | Great Britain | 260—281 |
| 260,240 | 2/1968 | Austria | 260—281 |

DONALD G. DAUS, Primary Examiner

U.S. Cl. X.R.

260—247.2 R, 268 BC, 293.61, 326.1, 326.5 FM; 424—248, 267, 274